United States Patent [19]

Newland

[11] 3,834,275
[45] Sept. 10, 1974

[54] WELD BEAD REMOVAL PROCEDURE

[75] Inventor: Tandy H. Newland, Waynesville, Ohio

[73] Assignee: General Motors Corporation, Detroit, Mich.

[22] Filed: July 25, 1973

[21] Appl. No.: 382,316

[52] U.S. Cl. ............... 90/24 B, 29/33 D, 90/11 C, 83/1, 83/176, 408/19
[51] Int. Cl. ............................................. B23d 1/00
[58] Field of Search ............ 90/24 B, 11 C; 83/176, 83/1; 29/33 D; 408/19

[56] References Cited
UNITED STATES PATENTS
1,215,773  2/1917  Butcher ............................ 90/24 B
2,923,208  2/1960  Hotchkiss et al. .................. 90/24 B

*Primary Examiner*—Andrew R. Juhasz
*Assistant Examiner*—Z. R. Bilinsky
*Attorney, Agent, or Firm*—Saul Schwartz

[57] ABSTRACT

In the manufacture of cylindrical, seam-welded tube from strip stock wherein a strip is cold rolled into a cylindrical tube and the longitudinal edges of the strip are welded along a longitudinal seam of the tube, the weld operation leaving a longitudinal, raised bead on the internal cylindrical surface of the tube, a procedure for removing the weld bead including the steps of distending the internal surface of the tube in a plane containing the weld bead to a predetermined dimension exceeding the nominal internal diameter of the welded tube thereby to locate the bead at a constant radial distance from the longitudinal axis of the tube, disposing within the tube a cutting tool having a cutting edge located at a fixed radial distance from the axis of the tube exceeding the constant radial distance, and effecting relative longitudinal movement between the cutting tool and the tube so that the weld bead is removed to a constant depth.

2 Claims, 6 Drawing Figures

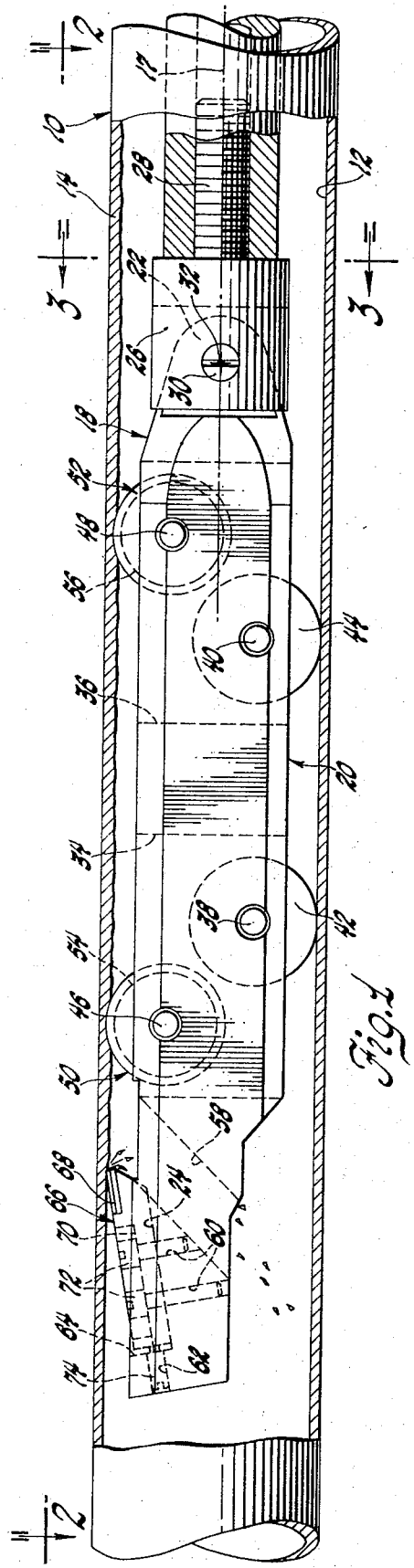
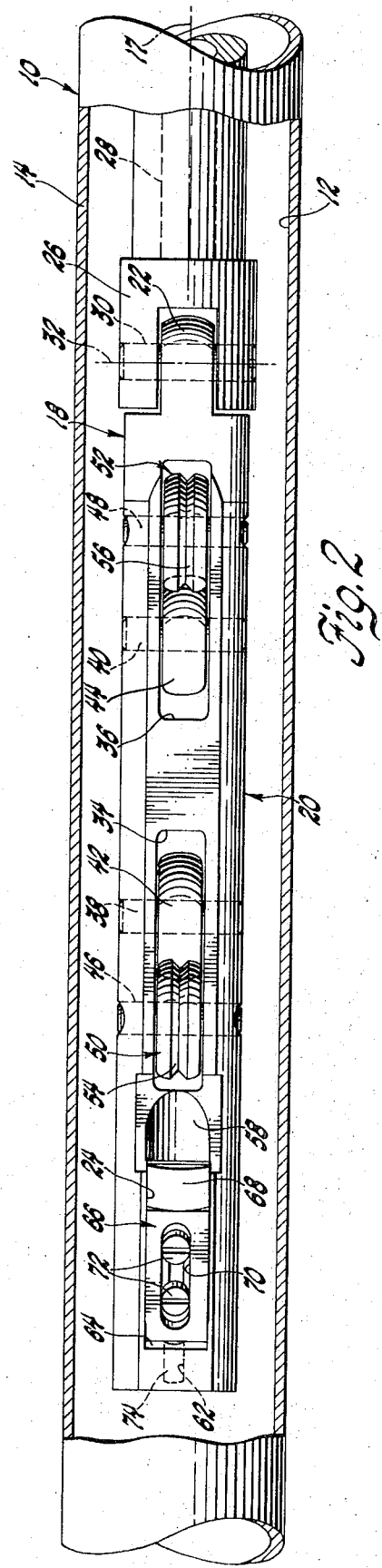

PATENTED SEP 10 1974 3,834,275
SHEET 2 OF 2

WELD BEAD REMOVAL PROCEDURE

This invention relates generally to the manufacture of seam-welded tube and, more particularly, to an improved procedure for removing a weld bead or weld flash from the internal surface of the tube.

A well known procedure for manufacturing seam-welded, metal tube from flat, strip stock includes a first step wherein the flat metal strips are cold rolled into cylindrical tubes, the lingitudinal edges of the strips defining a longitudinally extending seam on the tube. The seam is then welded through the full wall thickness of the tube so that an effectively seamless cylindrical tube is formed. The welding step, however, generates a raised, longitudinally extending bead where the edge interface existed which must be removed before the welded tube can be sized, the sizing operation being the final step in the manufacturing procedure. Typically, the bead is removed by a cutting tool supported on a tool carrier within the tube with no provision being made for tube wall thickness variation so that as the tool moves relative to the tube the depth of cut varies in direct proportion to the thickness of the tube wall. Thus, in areas where the tube wall increases in thickness the depth of cut similarly increases and vice versa. An improved procedure according to this invention eliminates variation in the depth of the bead removal cut and thus improves the uniformity of the finished tube after sizing.

The primary feature, then, of this invention is that it provides an improved procedure for removing a longitudinally extending weld bead from the inside surface of a cylindrical, seam-welded tube. Another feature of this invention is that it provides an improved procedure of the type described wherein a cutting tool removes the weld bead while maintaining a constant depth of cut regardless of variations in the wall thickness of the tube. Yet another feature of this invention is that it provides an improved procedure of the type described wherein the depth of cut is maintained constant by first distending the inside surface of the tube in a plane containing the weld bead to a predetermined dimension exceeding the nominal inside diameter of the tube so that the weld bead is maintained at a constant distance from the longitudinal axis of the tube and then positioning the cutting tool at a second predetermined distance from the longitudinal axis of the tube exceeding the constant distance. A still further feature of this invention is that it provides an improved procedure of the type described wherein the inside surface of the tube is distended by a plurality of rolling elements disposed on a tool carrier within the tube, the cutting tool being supported on the tool carrier behind the rolling elements to engage the tube wall after the latter has been distended by the rolling elements.

These and other features of this invention will be readily apparent from the following specification and from the drawings wherein:

FIG. 1 is a side elevational view, partly in section, of a tool carrier for performing the improved procedure according to this invention;

FIG. 2 is a sectional view taken generally along the plane indicated by lines 2—2 in FIG. 1;

Figure 5:
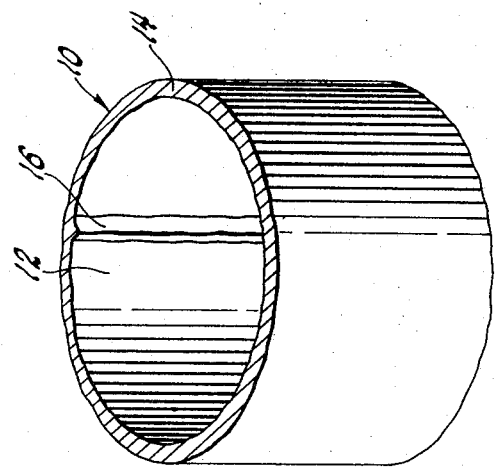
FIG. 5 is a perspective view of a typical section of seam-welded tube prior to undergoing the improved procedure according to this invention.

Referring now to FIGS. 1, 2, 3 and 5 of the drawings, a length of cylindrical seam-welded metal tube designated 10, FIG. 5, is shown and represents a typical section of a length of seam-welded tube which may, under production conditions, be 20 feet or more in length. The tube 10 is shown as already having undergone the welding procedure described hereinbefore and includes an internal cylindrical surface 12, an annular wall 14, and a weld bead 16 raised with respect to the cylindrical surface 12. The bead 16 extends longitudinally along the tube in generally parallel relation to the longitudinal axis 17 of the tube. However, due to normal thickness variations in the strip stock, the thickness of the tube wall 14 is similarly variable so that at some locations the bead 16 is nearer to the axis 17 than at other locations. The improved procedure according to this invention functions to remove the bead 16 while maintaining the constant depth of cut in the wall 14 regardless of thickness variations.

Reffering again to FIGS. 1, 2 and 3, a tool carrier 18 is disposed within the tube 10 and includes an elongated body portion 20 defining a lug 22 at one end thereof and a tool support ledge 24 at the other end thereof. A clevis 26 having a threaded stud 28 integral therewith is attached to the lug 22 through a pin 30 for pivotal movement about an axis 32 defined by the lug. The stud 28 is adapted for attachment to a conventional fixture, not shown, which maintains the tool carrier stationary as the tube 10 is longitudinally shifted relative thereto.

The body portion 20 of the tool carrier 18 includes a pair of vertical slots 34 and 36 aligned on the longitudinal plane of symmetry of the tool carrier. A pair of lower pins 38 and 40 are rigidly supported on the body portion 20 and project across respective ones of the slots 34 and 36 along generally horizontal, longitudinally spaced axes. A rolling element 42 is rotatably journaled on the pin 38 within the slot 34 and a similar rolling element 44 is rotatably journaled on the pin 40 within the slot 36. As seen best in FIG. 3, the cylindrical surface portions of the rolling elements 42 and 44 are crowned in an arc complementary to the internal curvature of the cylindrical surface 12 of the tube 10 to effect surface-to-surface emgagement between the rolling elements and the surface 12.

Again referring to FIGS. 1, 2 and 3, a pair of upper pins 46 and 48 are rigidly supported on the body portion 20 and project across respective ones of the slots 34 and 36 along spaced, parallel axes. A rolling element 50 is rotatably journaled on the pin 46 within the slot 34 and a similar rolling element 52 is rotatably journaled on the pin 48 within the slot 36. The outer cylindrical surface of each of the rolling elements 50 and 52 is crowned in an arc complementary to the internal curvature of the internal cylindrical surface 12 to effect surface-to-surface engagement between the rolling elements and the internal surface of the tube. The outer cylindrical surface of the rolling element 50 is interrupted by a generally triangular circumferential groove 54 aligned on the longitudinal plane of symmetry of the tool carrier. The outer cylindrical surface of the rolling element 52 is interrupted by a triangular circumferential groove 56 similarly aligned on the longitudinal plane of symmetry. Accordingly, the four rolling elements 42, 44, 50 and 52, are disposed in a common plane coinciding with the longitudinal plane of symmetry of the tool carrier.

Figure 4:
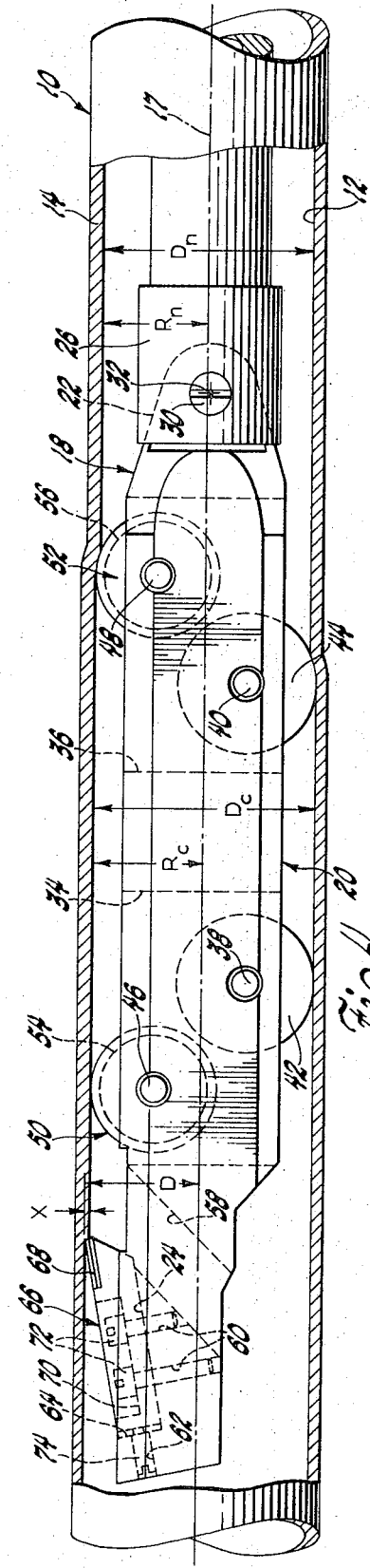
FIG. 4 is similar to FIG. 1 but showing in exaggerated fashion the internal distensions of the tube.

As seen best in FIGS. 1, 2 and 4, the tool support ledge 24 intersects an oblique chip removal slot 58 in the body portion 20. A pair of threaded bores 60 extend from the ledge 24 into the chip removal slot 58 while another threaded bore 62, disposed in the longitudinal plane of symmetry of the tool carrier, extends from a shoulder 64 defining one edge of the ledge to the rearward extremity of the body portion 20.

A conventional cutting tool 66 having a hardened cutting edge 68 is desposed on the ledge 24 for fore and aft sliding movement relative to the tool carrier. A slot 70, FIG. 2, in the cutting tool 66 slidably receives a pair of cap screws 72 which screws are threadedly received in corresponding ones of the bores 60. the bore 62 threadedly receives an adjusting screw 74 which projects beyond the shoulder 64 and into engagement with the rearward edge of the cutting tool 66. Rotation of the adjusting screws 74 effects concurrent bodily shiftable movement thereof which, in turn, effects bodily shiftable movement of the cutting tool along the ledge 24. The cap screws 72, of course, function to positively lock the cutting tool in any desired position.

Referring particularly now to FIG. 4, after the tube undergoes the cold rolling and seam welding steps of the manufacturing procedure, the tube defines a nominal inside diameter designated $D_n$ and a corresponding nominal radius $R_n$ with respect to the longitudinal centerline 17 of the tube. The wall thickness of the tube, of course, varies within the tolerance limits of the strip stock thickness and may induce corresponding variations in the depth of cut, designated X produced by the cutting edge 68. To insure that the depth of cut X remains constant, the improved manufacturing procedure according to this invention contemplates maintaining the weld bead at a constant, predetermined distance $R_c$ from the centerline 17 of the tube, the distance $R_c$ exceeding the nominal radius $R_n$. It follows, then, that by maintaining the cutting edge 68 at a predetermined distance D from the centerline 17 exceeding the distance $R_c$, the depth of cut X will remain constant.

Referring again to FIG. 4, the upper rolling elements 50 and 52 are vertically spaced from the lower rolling elements such that a vertical dimension $D_c$ is defined between a pair of horizontal planes one of which is tangent to both upper rolling elements 50 and 52 and the other of which is tangent to both lower rolling elements 42 and 44. The dimension $D_c$ exceeds the nominal diameter $D_n$ of the tube by a predetermined amount.

Figure 3:
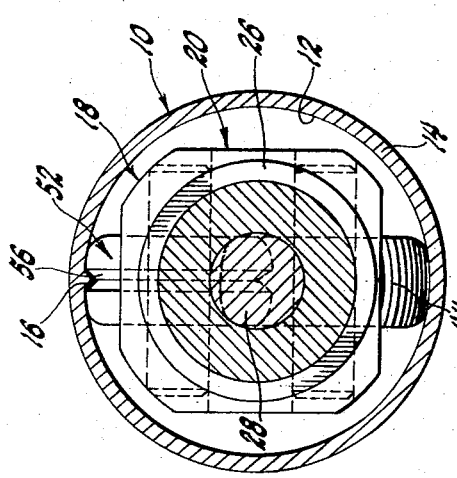
FIG. 3 is a sectional view taken generally along the plane indicated by lines 3—3 in FIG. 1.

Therefore, when the tool carrier 18 is introduced into the tube with the bead 16 disposed in the longitudinal plane of symmetry of the carrier and in the grooves 54 and 56, FIGS. 2 and 3, the rolling elements distend or permanently deform the internal cylindrical surface 12 to the dimension $D_n$ in the plane of the weld bead. The tool carrier, of course, centers itself with respect to centerline 17 so that by calculating $D_n$ to be twice the dimension $R_c$, the dimension $R_c$ is very accurately established between the centerline 17 and the internal cylindrical surface 12 at the bead 16.

The desired depth of cut X is, of course, determined by such factors as cutting speed required, tool life expectancy, material hardness and the like. However, once a particular depth of cut dimension X is established, the cutting edge 68 is adjusted until the dimension D between the cutting edge 68 and the centerline 17 equals the sum of the dimension $R_c$ and the depth of cut X. Having achieved this setting, the cap screws 72 are threaded into the bores 60 to rigidly lock the cutting tool and the tool carrier.

Describing now the weld bead removal procedure, the tool carrier is aligned along the path of movement of the welded tube and held stationary by an appropriate fixture, not shown. The tube is then introduced over the tool carrier with the weld bead aligned with the grooves 54 and 56 in the upper rolling elements 50 and 52, FIG. 3. Accordingly, as the tube is thereafter forcibly moved longitudinally relative to the tool carrier, the rolling elements internally distend the internal cylindrical surface 12 of the tube in the plane of the bead 16 to the dimension $R_c$ with respect to the centerline 17. When the cutting edge 68 engages the leading edge of the tube 10 in response to continued relative displacement of the tube, the cutting edge undercuts the weld bead to the desired depth X which, of course, remains constant throughout the duration of the cutting operation.

Figure 6:
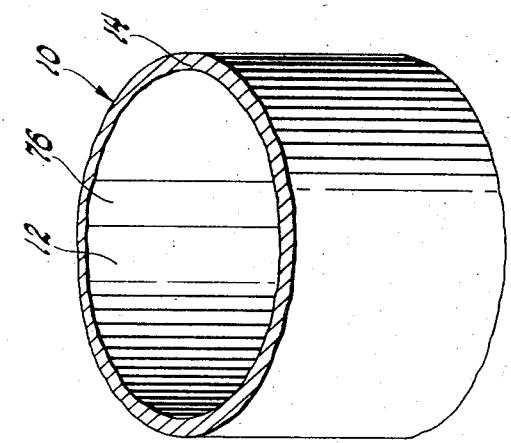
FIG. 6 is similar to FIG. 5 but showing the typical section of tube subsequent to undergoing the improved procedure according to this invention.

As seen best in FIG. 6, the tube 10, after completion of the bead removal procedure, is marked by a shallow groove 76 which is uniform in shape and depth. The depth and width of the groove 76 is predetermined so that the subsequent sizing operation in no way is effected.

Having thus described the invention, what is claimed is:

1. In a procedure for removing a longitudinally extending weld bead from the internal surface of a cylindrical seam-welded tube having a nominal inside diameter and a wall thickness variable between predetermined limits, said tube having a tool carrier disposed therein for relative longitudinal bodily movement and said tool carrier supporting a cutting tool having a cutting edge of width exceeding the width of said weld bead, the improvement comprising the steps of internally distending said tube generally in a longitudinal plane containing said weld bead and the longitudinal axis of said tube to a predetermined dimension exceeding said nominal inside diameter thereby to locate said weld bead at a substantially constant predetermined radial distance from the longitudinal axis of said tube, positioning said cutting edge of said cutting tool across said weld bead and at a predetermined radial distance from the longitudinal axis of said tube exceeding said substantially constant predetermined radial distance so that said cutting edge is embedded in said tube, and effecting relative longitudinal movement between said carrier and said tube so that said cutting tool removes said weld bead to a substantially constant depth.

2. In a procedure for removing a longitudinally extending weld bead from the internal surface of a cylindrical seam-welded tube having a nominal inside diamter and a wall thickness variable between predetermined limits, said tube having a tool carrier disposed therein for relative longitudinal bodily movement and said tool carrier supporting a cutting tool having a cutting edge of width exceeding the width of said weld bead and a plurality of spaced rolling elements disposed in a common plane for engaging the internal surface of said tube at diametrically opposed location on the latter, the improvement comprising the steps of locating said rolling elements on said carrier such that interference engagement of predetermined magnitude is effected between said rolling elements and the internal surface of said tube, effecting relative longitudinal movement between said carrier and said tube so that said tube is internally distended by said rolling elements in a longitudinal plane containing said weld bead and the longitudinal axis of said tube to a predetermined dimension exceeding the nominal inside diameter of said tube thereby to locate said weld bead at a substantially constant radial distance from the longitudinal axis of said tube, and positioning said cutting tool on said carrier behind said rolling elements with respect to the direction of movement of said carrier relative to said tube such that said cutting edge is disposed across said weld bead and at a predetermined radial distance from the longitudinal axis of said tube exceeding said substantially constant predetermined radial distance so that said cutting edge is embedded in said tube, said cutting tool removing said weld bead to a substantially constant depth in response to relative longitudinal movement between said carrier and said tube.

* * * * *